(12) United States Patent
Cheong et al.

(10) Patent No.: US 6,553,480 B1
(45) Date of Patent: Apr. 22, 2003

(54) SYSTEM AND METHOD FOR MANAGING THE EXECUTION OF INSTRUCTION GROUPS HAVING MULTIPLE EXECUTABLE INSTRUCTIONS

(75) Inventors: Hoichi Cheong, Austin, TX (US); Hung Qui Le, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/434,095

(22) Filed: Nov. 5, 1999

(51) Int. Cl.[7] ................................................. G06F 9/38
(52) U.S. Cl. ............................................. 712/23; 712/244
(58) Field of Search .................................... 712/23, 244, 213

(56) References Cited

U.S. PATENT DOCUMENTS

| | | | | |
|---|---|---|---|---|
| 5,432,795 A | * | 7/1995 | Robinson | 708/530 |
| 5,799,165 A | * | 8/1998 | Favor et al. | 712/214 |
| 6,035,394 A | * | 3/2000 | Ray et al. | 712/245 |
| 6,131,157 A | * | 10/2000 | Wang et al. | 712/217 |
| 6,173,421 B1 | * | 1/2001 | Weaver Johnson et al. | 709/315 |
| 6,185,674 B1 | * | 2/2001 | Chan et al. | 712/230 |

* cited by examiner

Primary Examiner—Eric Coleman
(74) Attorney, Agent, or Firm—Volel Emile; Bracewell & Patterson, L.L.P.

(57) ABSTRACT

A group completion table (GCT) that manages the execution of instruction groups having more than one executable instruction is disclosed. The GCT includes a plurality of table entries, wherein each of the table entries is associated with a respective instruction group. Each table entry in the GCT includes a plurality of instruction completion identifiers, wherein each of the instruction completion identifiers corresponds to a specific instruction in the associated instruction group. The table entry also includes a trouble identifier that is utilized to flag the occurrence of any exception condition encountered in the execution of any instruction in the instruction group. In a related embodiment, the trouble identifier utilized in the table entry is a single bit.

27 Claims, 3 Drawing Sheets

SYSTEM AND METHOD FOR MANAGING THE EXECUTION OF INSTRUCTION GROUPS HAVING MULTIPLE EXECUTABLE INSTRUCTIONS

BACKGROUND OF THE INVENTION

1. Technical Field of the Invention

The present invention relates generally to data processing and, in particular, to processors that support out of order instruction execution. Still more particularly, the present invention relates to a system and method for managing the execution of an instruction group having multiple executable instructions.

2. Description of the Related Art

The evolution of microprocessors has reached the point where architectural concepts pioneered in vector processors and mainframe computers of the 1970s, such as the CDC-6600 and Cray-1, are appearing in Reduced Instruction Sets Computing (RISC) processors. Early RISC machines were very simple single-chip processors. As Very Large Scale Integrated (VLSI) technology improves, more additional space becomes available on a semiconductor chip. Rather than increase the complexity of a processor architecture, most designers have decided to use the additional space to implement techniques to improve the execution of their current processor architecture. Two principal techniques utilized are on-chip caches and instruction pipelines.

A next step in this evolutionary process is the superscalar processor. The name implies that these processors are scalar processors that are capable of executing more than one instruction in each cycle. The elements to superscalar execution are an instruction fetching unit that can fetch more than one instruction at a time from a cache memory; instruction decoding logic that can decide when instructions are independent and thus can be executed simultaneously; and sufficient execution units to be able to process several instructions at one time. It should be noted that the execution units may be pipelined, e.g., they may be floating point adders or multipliers, in which case, the cycle time for each stage matches the cycle times for the fetching and decoding logic. In many systems, the high level architecture has remained unchanged from earlier scalar designs. The superscalar processor designs typically use instruction level parallelism for improved implementations of these architectures.

Within a superscalar processor, instructions are first fetched, decoded and then buffered. Instructions can be dispatched to executions units out of program order as resources and operands become available. Additionally, instructions can be fetched and dispatched speculatively based on predictions about branches taken. The result is a pool of instructions in varying stages of execution, none of which have completed by writing final results. As resources become available and branches are resolved, instructions are "retired" in program order. This preserves the appearance of a machine that executes the instructions in program order.

A superscalar processor tracks, or manages, instructions that have been speculatively executed typically utilizing a completion buffer. Each executed instruction in the buffer is associated with its results, which are generally stored in rename registers, and any exception flags. A retire unit removes these executed instructions from the buffer typically in program order. The retire unit then updates designated registers with the computed results from the rename registers. A problem arises, however, when instructions are executed out of order; in particular when one of the instructions encounters an exception condition. The processor architecture requires that when an instruction has an exception, then the processor must stop at that point in the program. This is because effects from instructions executed after the instruction that has an exception should neither be reflected in the state of the machine nor should there be any unexecuted instructions before it. This characteristic is generally known as a precise exception or interrupt. By retiring instructions in order, the processor can maintain precise exceptions. To accomplish this, conventional processors typically employ a methodology, whereby each executable instruction is associated with an exception flag. Thus, a completion buffer contains a equal number of exception flags as instructions tracked by the buffer. Furthermore, a separate cycle is used to read the completion status, including checking the exception flag, of each individual instruction to determine if the instruction can be retired. Therefore, even though the processor can execute more than one instruction every cycle, the processor is generally limited to retiring only one instruction per cycle per read port of the retire unit that, in turn, limits the processing "throughput" of the processor.

Accordingly, what is needed in the art is an improved processor architecture that mitigates the above described limitations.

SUMMARY OF THE INVENTION

It is therefore an object of the present invention to provide an improved processor.

It is another object of the present invention to provide a group completion table that manages the execution of instruction groups having more than one executable instruction and a method of operation thereof.

To achieve the foregoing objects, and in accordance with the invention as embodied and broadly described herein, the present invention provides a group completion table (GCT) that manages the execution of instruction groups having more than one executable instruction. The GCT includes a plurality of table entries, wherein each of the table entries is associated with a respective instruction group. Each table entry in the GCT includes a plurality of instruction completion identifiers, wherein each of the instruction completion identifiers corresponds to a specific instruction in the associated instruction group. The table entry also includes a trouble identifier that is utilized to flag the occurrence of any exception condition encountered in the execution of any instruction in the instruction group. In a related embodiment, the trouble identifier utilized in the table entry is a single bit.

The present invention introduces a novel method utilizing a single trouble identifier in a group completion table to track and manage the execution status of all of the instruction in an instruction group. Unlike conventional techniques that typically employ a separate exception indicator for each instruction, the present invention utilizes a single exception indicator for each instruction group. In this manner, the instructions in the instruction group are retired en bloc in one cycle, in contrast to using multiple cycles (equal to the number of instructions in the instruction group) when employing conventional techniques. The present invention significantly increases the processing throughput of a processor, a substantial consideration in the design and use of processors.

In one embodiment of the present invention, the GCT further includes a plurality of write ports that, preferably, are coupled to an equal number of execution units. Those skilled in the art should readily appreciate that the execution units generally include fixed and floating point execution units.

In another embodiment of the present invention, a table entry further comprises a single exception information identifier for all the instructions in the associated instruction group.

In yet another embodiment of the present invention, the instruction group has five instructions. It should be noted that the number of instructions in the instruction group is not limited to five but may be any arbitrary number greater than one. The present invention does not contemplate limiting its practice to any one particular number. In a related embodiment, the last instruction in an instruction group is a delimiter identifier. In an advantageous embodiment, the delimiter identifier is a branch (BR) instruction. Alternatively, in another advantageous embodiment, the delimiter identifier is a no-operation (no-op) instruction.

In another embodiment of the present invention, each instruction group is associated with a group tag number that corresponds to a table entry. Furthermore, in a related embodiment, an instruction in an instruction group is identified by the instruction group's group tag number concatenation with a multiple bit mask. The multiple bit mask indicates the location of the instruction in its instruction group.

The foregoing description has outlined, rather broadly, preferred and alternative features of the present invention so that those skilled in the art may better understand the detailed description of the invention that follows. Additional features of the invention will be described hereinafter that form the subject matter of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
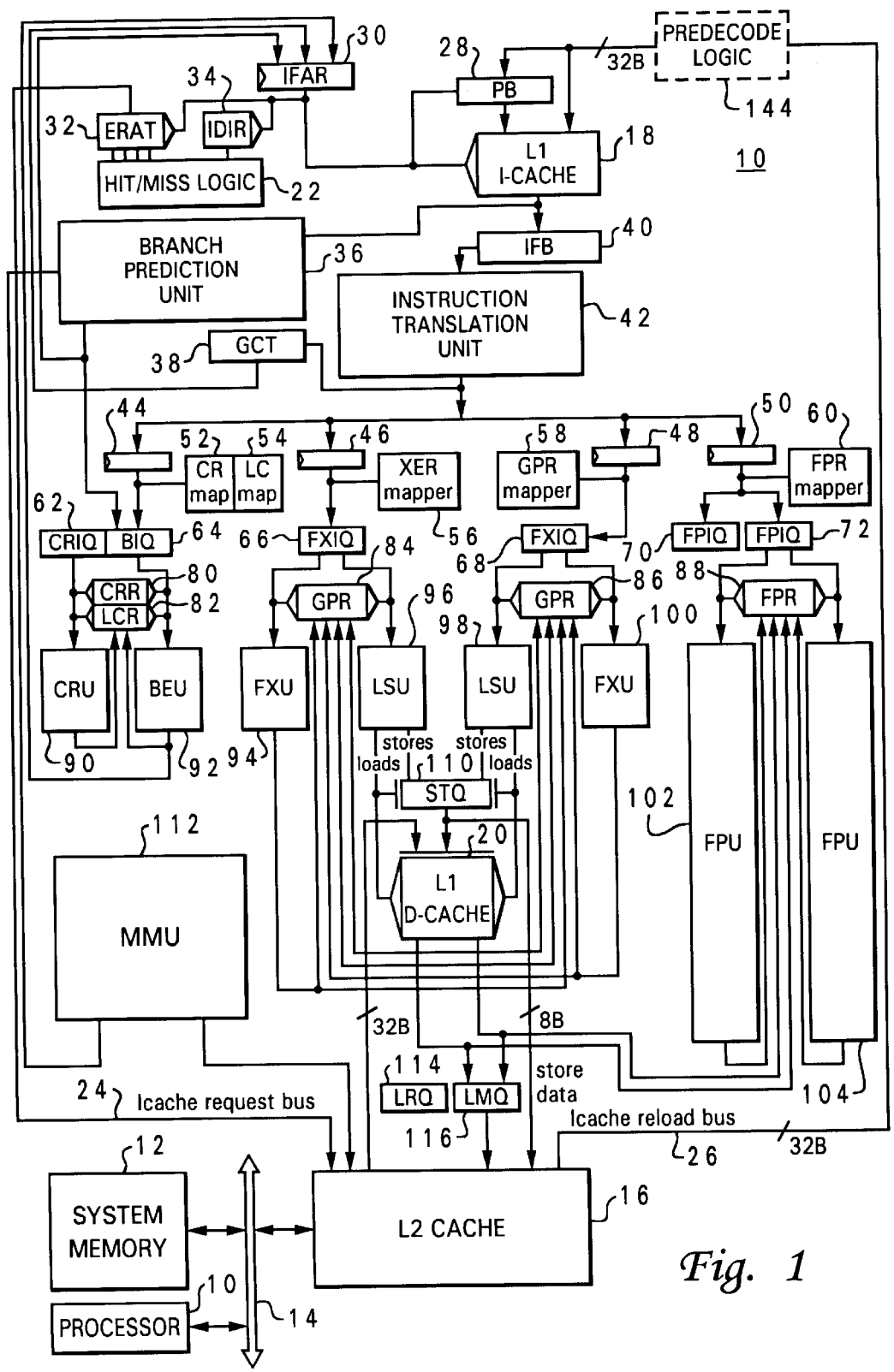
FIG. 1 illustrates a high level block diagram of an illustrative embodiment of a processor for processing instructions and data in accordance with the present invention.

With reference now to the figures and in particular with reference to FIG. 1, there is depicted a high level block diagram of an illustrative embodiment of a processor, generally designated 10, for processing instructions and data-in accordance with the present invention. Processor 10 comprises a single integrated circuit superscalar processor, which, as discussed further below, includes various execution units, registers, buffers, memories, and other functional units that are all formed by integrated circuitry. As illustrated in FIG. 1, processor 10 may be coupled to other devices, such as a system memory 12 and a second processor 10, by an interconnect fabric 14 to form a larger data processing system such as computer system.

Processor 10 has an on-chip multi-level cache hierarchy including a unified level two (L2) cache 16 and bifurcated level one (L1) instruction (I) and data (D) caches 18 and 20, respectively. As is well-known to those skilled in the art, caches 16, 18 and 20 provide low latency access to cache lines corresponding to memory locations in system memory 12.

Instructions are fetched for processing from L1 I-cache 18 in response to the effective address (EA) residing in instruction fetch address register (IFAR) 30. During each cycle, a new instruction fetch address may be loaded into IFAR 30 from one of three sources: branch prediction unit (BPU) 36, which provides speculative path addresses resulting from the prediction of conditional branch instructions, group completion table (GCT) 38, which provides interrupt or special redirected addresses, and branch execution unit (BEU) 92, which provides non-speculative addresses resulting from the resolution of incorrectly predicted conditional branch instructions. If hit/miss logic 22 determines, after translation of the EA contained in IFAR 30 by effective-to-real address translation (ERAT) 32 and lookup of the real address (RA) in I-cache directory 34, that the cache line of instructions corresponding to the EA in IFAR 30 does not reside in L1 I-cache 18, then hit/miss logic 22 provides the RA to L2 cache 16 as a request address via I-cache request bus 24. Such request addresses may also be generated by prefetch logic within L2 cache 16 based upon recent access patterns. In response to a request address, L2 cache 16 outputs a cache line of instructions, which are loaded into prefetch buffer (PB) 28 and L1 I-cache 18 via I-cache reload bus 26, possibly after passing through optional predecode logic 144.

Once the cache line specified by the EA in IFAR 30 resides in L1 cache 18, L1 I-cache 18 outputs the cache line to both branch prediction unit (BPU) 36 and to instruction fetch buffer (IFB) 40. BPU 36 scans the cache line of instructions for branch instructions and predicts the outcome of conditional branch instructions, if any. Following a branch prediction, BPU 36 furnishes a speculative instruction fetch address to IFAR 30, as discussed above, and passes the prediction to branch instruction queue 64 so that the accuracy of the prediction can be determined when the conditional branch instruction is subsequently resolved by branch execution unit 92.

IFB 40 temporarily buffers the cache line of instructions received from L1 I-cache 18 until the cache line of instructions can be translated by instruction translation unit (ITU) 42. In the illustrated embodiment of processor 10, ITU 42 translates instructions from user instruction set architecture (UISA) instructions into a possibly different number of internal ISA (IISA) instructions that are directly executable by the execution units of processor 10. Such translation may be performed, for example, by reference to microcode stored in a read-only memory (ROM) template. In at least some embodiments, the UISA-to-IISA translation results in a different number of IISA instructions than UISA instructions and/or IISA instructions of different lengths than corresponding UISA instructions. The resultant IISA instructions are then assigned by group completion table 38 to an instruction group, the members of which are permitted to be dispatched and executed out-of-order with respect to one another. Group completion table 38 tracks each instruction group for which execution has yet to be completed by at least one associated EA, which is preferably the EA of the oldest instruction in the instruction group.

Following UISA-to-IISA instruction translation, instructions are dispatched to one of latches 44, 46, 48 and 50, based upon instruction type. That is, branch instructions and other condition register (CR) modifying instructions are dispatched to latch 44, fixed-point and load-store instructions are dispatched to either of latches 46 and 48, and floating-point instructions are dispatched to latch 50. Each instruction requiring a rename register for temporarily storing execution results is then assigned one or more rename registers by the appropriate one of CR mapper 52, link and count (LC) register mapper 54, exception register (XER) mapper 56, general-purpose register (GPR) mapper 58, and floating-point register (FPR) mapper 60.

The dispatched instructions are then temporarily placed in an appropriate one of CR issue queue (CRIQ) 62, branch issue queue (BIQ) 64, fixed-point issue queues (FXIQs) 66 and 68, and floating-point issue queues (FPIQs) 70 and 72. From issue queues 62, 64, 66, 68, 70 and 72, instructions can be issued opportunistically to the execution units of processor 10 for execution as long as data dependencies and antidependencies are observed.

As illustrated, the execution units of processor 10 include a CR unit (CRU) 90 for executing CR-modifying instructions, a branch execution unit (BEU) 92 for executing branch instructions, two fixed-point units (FXUs) 94 and 100 for executing fixed-point instructions, two load-store units (LSUs) 96 and 98 for executing load and store instructions, and two floating-point units (FPUs) 102 and 104 for executing floating-point instructions. Each of execution units 90–104 is preferably implemented as an execution pipeline having a number of pipeline stages.

During execution within one of execution units 90–104, an instruction receives operands, if any, from one or more architected and/or rename registers within a register file coupled to the execution unit. When executing CR-modifying or CR-dependent instructions, CRU 90 and BEU 92 access the CR register file 80, which in a preferred embodiment contains a CR and a number of CR rename registers that each comprise a number of distinct fields formed of one or more bits. Among these fields are LT, GT, and EQ fields that respectively indicate if a value (typically the result or operand of an instruction) is less than zero, greater than zero, or equal to zero. Link and count register (LCR) register file 82 contains a count register (CTR), a link register (LR) and rename registers of each, by which BEU 92 may also resolve conditional branches to obtain a path address. General-purpose register files (GPRs) 84 and 86, which are synchronized, duplicate register files, store fixed-point and integer values accessed and produced by FXUs 94 and 100 and LSUs 96 and 98. Floating-point register file (FPR) 88, which like GPRs 84 and 86 may also be implemented as duplicate sets of synchronized registers, contains floating-point values that result from the execution of floating-point instructions by FPUs 102 and 104 and floating-point load instructions by LSUs 96 and 98.

After an execution unit finishes execution of an instruction, the execution notifies GCT 38, which schedules completion of instructions in program order. To complete an instruction executed by one of CRU 90, FXUs 94 and 100 or FPUs 102 and 104, GCT 38 signals mappers 52, 54, 56, 58, 60 to marked the renamed registers associated with the completing group as architected registers and free up any old architected registers associated with the completing group. The instruction is then removed from GCT 38. Other types of instructions, however, are completed differently.

When BEU 92 resolves a conditional branch instruction and determines the path address of the execution path that should be taken, the path address is compared against the speculative path address predicted by BPU 36. If the path addresses match, no further processing is required. If, however, the calculated path address does not match the predicted path address, BEU 92 supplies the correct path address to IFAR 30. In either event, the branch instruction can then be removed from BIQ 64, and when all other instructions within the same instruction group have completed, from GCT 38.

Following execution of a load instruction, the effective address computed by executing the load instruction is translated to a real address by a data ERAT (not illustrated). If the ERAT translation is successful, it is then provided to L1 D-cache 20 as a request address. If the ERAT translation is not successful, a table walk process (not shown) is initiated to translate the address as required by the processor architecture to obtain the real address. If the table walk process is successful, the real address is then provided to the L1 D-Cache 20 as a request address. At this point, the load instruction is removed from FXIQ 66 or 68 and placed in load reorder queue (LRQ) 114 until the indicated load is performed. If the translation is not successful, the load is terminated and a finish report is sent to GCT 38 to indicate that an exception condition has been detected for this load. Exception information is also saved by the LSU executing this load for later processing. If the request address misses in L1 D-cache 20, the request address is placed in load miss queue (LMQ) 116, from which the requested data is retrieved from L2 cache 16, and failing that, from another processor 10 or from system memory 12. LRQ 114 snoops exclusive access requests (e.g., read-with-intent-to-modify), flushes or kills on interconnect fabric 14 against loads in flight, and if a hit occurs, cancels and reissues the load instruction. When data is returned for the load, LSU 96 or 98 writes data to the appropriate renamed register and signals GCT 38 that the load has finished executing.

Store instructions are similarly translated. It is finished and GCT 38 notified as soon as the translation process completes. It is completed utilizing a store queue (STQ) 110 into which effective addresses for stores are loaded following execution of the store instructions. From STQ 110, data can be stored into either or both of L1 D-cache 20 and L2 cache 16.

Figure 2:
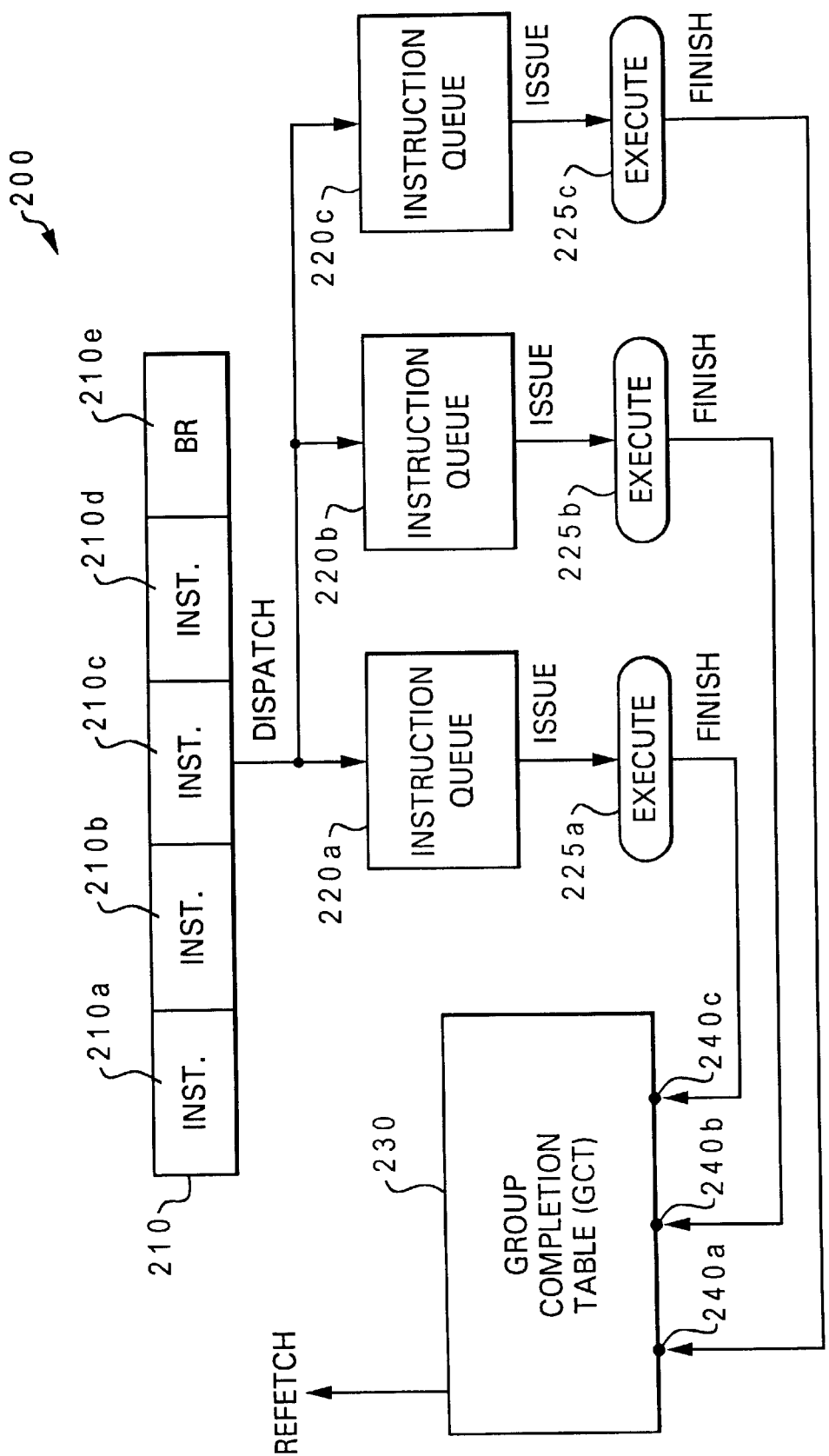
FIG. 2 illustrates a high level block diagram of an exemplary processing flow of an instruction group utilizing a group completion table according to the principles disclosed by the present invention.

Referring now to FIG. 2, with continuing reference to FIG. 1, there is illustrated a high level block diagram of an exemplary processing flow 200 of an instruction group 210 utilizing a group completion table 230 according to the principles disclosed by the present invention. Generally, processing flow 200 is initiated when ITU 42 forms the instruction group from instructions that were fetched from memory or I-Cache 18. In the illustrated embodiment, instructions are fetched from memory in groups of multiple instructions, e.g., eight, and "assembled" into instruction group 210, which may have a different number of instructions, e.g., five, that is identified with an unique group tag (Gtag) identifier. Although the present invention is described in the context of five instructions per instruction group, those skilled in the art should readily appreciate that the number of instructions in an instruction group is not limited to five, but may contain any number greater than one.

The Gtag identifier is assigned to an instruction group at dispatch and corresponds to a group completion table location, i.e. table entry, assigned to the instruction group. As shown, instruction group 210 includes first, second, third and fourth instructions 210a, 210b, 210c, 210d and terminates with a delimiter identifier 210e. Delimiter identifier 210e is utilized to indicate the end of an instruction group and, in an advantageous embodiment, is a branch (BR) instruction. Alternatively, in another advantageous embodiment, the delimiter identifier is a no-operation (no-op) instruction or any other special instruction that may require redirection of the execution flow. In general, instructions are tracked as a group and each instruction is assigned a instruction tag (Itag) that is the concatenation of a Gtag and a four bit mask that marks the location of the instruction in the instruction group.

Each instruction in instruction group 210 is typically augmented with a few additional characteristic bits, in addition to an Itag, generally to identify the instruction as a branch or not; to indicate the type of execution unit needed; and to provide a means of determining whether or not the instruction will make a memory reference. These additional identifiers may include a Load Tag (Ltag), Store Tag (Stag) and a Branch Tag (Btag). The Ltag corresponds to a load reorder queue that is assigned to a load instruction. The Stag, on the other hand, corresponds to a load reorder queue that is assigned to a store instruction. Typically, at dispatch, load instructions are assigned the last Stag and the next available Ltag, while store instructions are assigned the next available Ltag and the next available Stag. The Btag is typically assigned at the time an entry is allocated in a branch instruction queue for a branch instruction and is passed along with the instruction.

After instruction group 210 is assembled and assigned a Gtag, first, second, third and fourth instructions 210a–210d are dispatched to their appropriate issue queues, i.e., instruction queues 220a–220c (analogous to issue queues 62–72 illustrated in FIG. 1), where they are saved. As discussed previously, the plurality of instruction, or issue, queues 220a–220c may include a branch issue queue, a CR issue queue, a floating point issue queue and a fixed point issue queue. The branch issue queue may hold up to 12 branch instructions in its entry queue and the bottom most instruction that is ready is selected for issuing. For the CR issue queue, one 10 entry queue is utilized to receive up to two instructions and, as with the branch issue queue, the bottom most instruction that is ready is selected for issuing. The floating point issue queue has one 20 entry queue that contains floating point instructions and floating point store data instructions. It may receive up to four instructions and may issue up to 2 instructions per cycle and the bottom most instructions are selected for issuing. The fixed point issue queue, on the other hand, has two 18 entry queues that contain fixed point instructions, including load and store instructions. It can also receive up to 4 instructions per cycle and can issue 1 load/store and 1 non-load/store instructions per cycle from each queue. As with the other issue queues, the bottom most instruction in each class (load/store and non load/store) that is ready is selected for issuing. Generally, an instruction in any of the above described issue queues is selected for issuing when all the source operands for that instruction is available by the time it reaches one of a plurality of execution units, generally designated 225a–225c, and if the instruction requires serialization then it is in the next-to-complete group. It should be noted that there is a high probability that the oldest ready instruction in the issue queue is selected for issuing, but age-based selection is not guarantied.

Within each execution unit, instruction dependencies are checked by comparing a destination pointer of the renamed resource against all outstanding source physical pointer. Between execution units, instruction dependencies are checked using a destination renamed resource or the store tag (Stag). For example, in the case of a floating point load instruction, a floating point register (FPR) physical pointer is tagged with the load instruction as it is dispatched to the floating point execution unit (FXU). Three cycles before data is sent to a floating point unit (FPU), the FPR destination tag is sent to the FPU to allow it to identify the destination renamed FPR for the load data.

It should be noted that once instructions enter the instruction dispatch and reorder buffer, program order is relegated to a secondary concern. Integral to this methodology is the use of rename registers. Rename registers hold results until an instruction retires. At retirement, the rename registers are either copied to the architectural register named in the register or a table may be updated. Rename registers are important because they eliminated anti-dependencies and output dependencies in the instruction stream. Instructions can read or write to rename registers so that their execution can proceed while earlier instructions have locked the architectural registers. Register renaming also makes implementing speculative execution easier. When a branch is resolved, all the rename registers allocated to the wrong path are freed and only instructions on the correct path are allowed to retire.

Following the execution of the instructions in the plurality of execution units 225a–225c, the results, along with the instruction's Itag and an exception report (if any) are provided to the GCT 230. In a preferred embodiment, GCT 230 has a plurality of write ports 240a–240c that are coupled to the plurality of execution units 225a–225c. Typically, each write port is coupled to a single execution unit. The operation and utilization of GCT 230 is hereinafter described in greater detail with reference to FIGS. 3A and 3B, with continuing reference to FIG. 2.

Figure 3A:
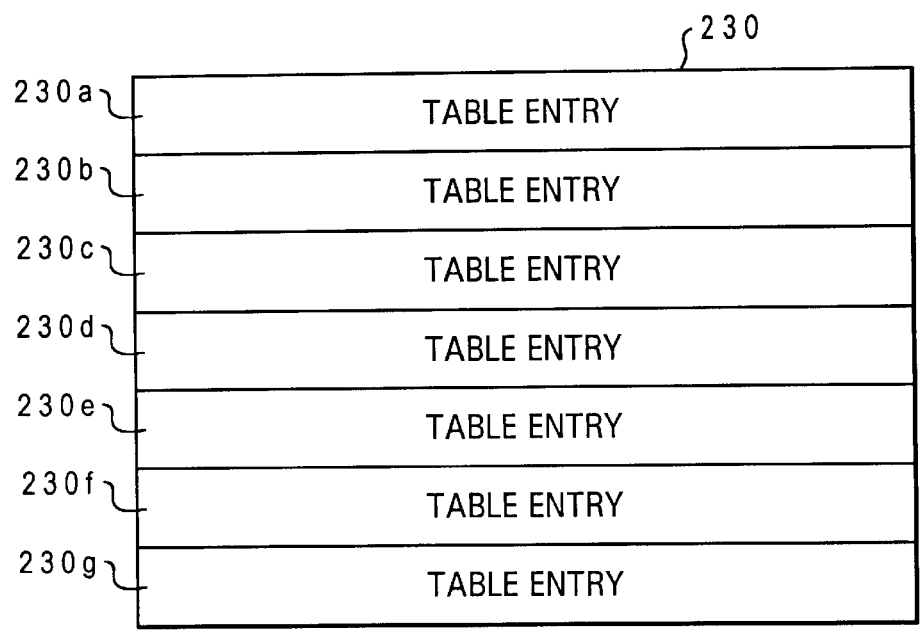
FIG. 3A illustrates an embodiment of the group completion table illustrated in FIG. 2.
Figure 3B:
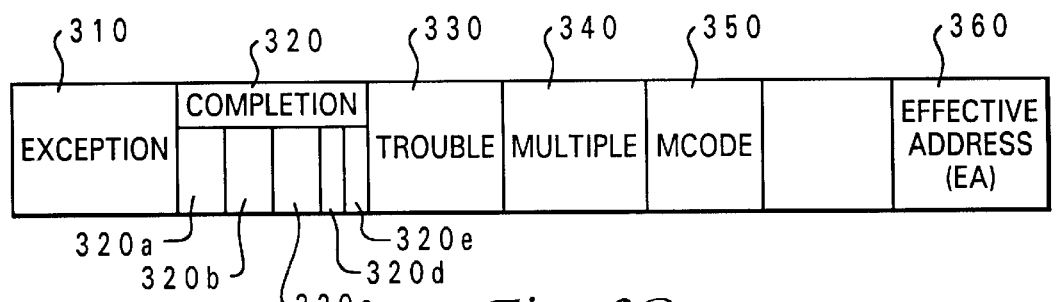
FIG. 3B illustrates an embodiment of a table entry in the group completion table.

Referring now to FIGS. 3A and 3B, there are depicted an embodiment of GCT 230 and an exemplary embodiment of a table entry in GCT 320. GCT 230 is typically implemented, in an advantageous embodiment, in an architectural register or a table and includes a plurality of table entries 230a–230g that are utilized to track and manage the execution of instruction groups in a First-In-First-Out (FIFO) fashion. Each table entry 230a–230g is associated with a particular instruction group. In a preferred embodiment, GCT 230 comprises 20 table entries logically separated into three tables, i.e., scea, sceb and scec tables. The scea table stores information that are readily decoded and captured from a dispatch buffer while the sceb table keeps account of the load/store tag usage generated from the information captured from the dispatched buffer. A finished report of a table entry is stored in the scec portion of GCT 230 and includes instruction and exception conditions reported with the dispatched instruction group by the execution units. It should be noted that the finished report stored in scec is considered a finished report from GCT 230.

Each of the plurality of table entries 230a–230g includes an exception information identifier 310, a completion identifier 320, a trouble identifier 330, a multiple instruction group identifier 340, a mcode field 350 and an address field 360. Exception information identifier 310 contains, in an advantageous embodiment, a 5 bit exception code reported by the execution units if an exception condition was encountered during the execution of any instruction in the instruction group associated with that particular table entry. It should be noted that the exception code reported by the execution units are ORed into exception information identifier 310 and only has significance or meaning when only one instruction in the instruction group has encountered an exception condition. Completion identifier 320 includes first, second, third, fourth and fifth instruction completion identifiers 320a–320e that corresponds to first, second, third, fourth and fifth instructions 210a–210e, respectively. In a preferred embodiment, a single bit is employed to indicate a finish status for each instruction in instruction group 210. It should be readily apparent to those skilled in the art that the number of finish bits in completion identifier 320 can vary depending on the number of instructions in an instruction group and is not limited to five, as in the depicted embodiment.

Multiple instruction group identifier 340, in a preferred embodiment is a single bit that is set when an executable instruction has multiple instructions that encompasses multiple instruction groups. For example, a PowerPC™ LM (load multiple) instruction when translated into machine executable code may involve 32 separate load instructions. It is obvious that a single instruction group cannot reflect its execution status. For the above example, 8 instruction groups must be used to track the execution of the PowerPC LM command. Mcode field 350 is associated with multiple instruction group identifier 340 and is utilized, in an advantageous embodiment, with a single bit that is set to indicate the last instruction group in a multiple instruction group set. Address field 360, having 62 bits in an advantageous embodiment, contains the effective address of the starting instruction, i.e., first instruction 210a, of the instruction group associated with the table entry and is used to prefetch the instruction group when any instruction in the instruction group initiates a redirection.

As discussed previously, when an execution unit finishes an instruction, the execution unit sends to GCT 230, via one of the write ports 240a–240c, the Itag of the finished instruction and an indication of the exception condition (if any). When all of the instructions in an instruction group have been executed successfully, i.e, trouble bit in trouble identifier 330 not set, completion detection logic (not shown) will retire the instruction group and reassigned the table entry in GCT 230 to another instruction group that is scheduled to be dispatched next.

In the event of an abnormal finish, i.e., trouble identifier 330 set, the completion logic will evaluate the specific table entry prior to initiating a flush. If an instruction causes an exception condition, e.g., an synchronous interrupt, such as a data storage interrupt or a floating point interrupt (divide by zero), the execution unit reports the exception to GCT 230 without waiting for the result. Furthermore, the execution unit will suppress the result generated by the instruction causing the exception, e.g., a load instruction causing an exception is not allowed to return data after the exception has been reported. If the instruction that causes the exception condition is the next-to-complete instruction in the instruction group, GCT 230 will mark the rest of the completion identifiers as finished and generate a flush. If, however, the instruction that caused the exception condition is not the next-to-complete instruction in the instruction group, GCT 230 waits until all the instructions preceding it in the instruction group is completed, i.e., finished, before GCT 230 initiates a flush of the instruction group. The instruction that caused the flush is identified by its Gtag identifier and a flush mask is generated. The flush mask is then sent to all the execution units that, in turn, identifies all the instructions in the flushed instruction group to free up all resources that are presently occupied by these instructions.

GCT 230 also refetches the instructions in the instruction group that encountered an exception condition in its execution by sending the effective address of the first instruction in the instruction group contained in address field 360 along with a start_new_mask indicator to an IFAR (analogous to IFAR 30 illustrated in FIG. 1). The start_new_mask is utilized to break the refetched instruction group into multiple groups, each of which contains a single instruction. Following the breakup of the refetched instruction group, the single instructions are dispatched and tracked in GCT 230 individually in a separate table entry. In this manner, the exception(s) caused by the instruction(s) can be identified and resolved.

In the event of an asynchronous interrupt, e.g., an external interrupt condition that has been defined for the processor executing the instruction groups, GCT 230 flushes all instruction groups that are younger, i.e., dispatched later, than the instruction group that is next-to-be completed. It then waits for the instruction group that is next-to-complete to finish execution. After the next-to-complete instruction group completes its execution, it then takes the interrupt.

When GCT 230 flushes speculative instructions, it sends a 20 bit flush mask to all execution units. The location of each bit in the flush mask corresponds to the Gtag of the group, i.e., bit 0 corresponds to Gtag value 0. An active bit in the flush mask indicates that the corresponding instruction group must be flush, e.g. all instructions in the instruction group are aborted. The flush mask is also sent to all the mappers so that the registers associated with the flushed instructions are reclaimed. Flushing by instruction group allows the use of a small number of bits ,e.g., 20 signals or 1 per instruction group, to flush a large number of instructions, i.e., 100 instructions or 5 instructions per instruction group.

The present invention may be embodied in other specific forms without departing from its spirit or essential characteristics. The described embodiments are to be considered in all respects as illustrative and not restrictive. The scope of the invention is, therefore, indicated by the appended claims rather than by the foregoing description. All changes which come within the meaning and range of equivalency of the claims are to be embraced within their scope.

What is claimed is:

1. A group completion table (GCT) that manages execution of instruction groups having more than one executable instruction, said GCT comprising:

a plurality of table entries, wherein each of said plurality of table entries is associated with a respective instruction group and includes:

a plurality of instruction completion identifiers, each of said plurality of instruction completion identifiers corresponding to a specific instruction in said associated instruction group; and a trouble identifier that will flag the occurrence of any exception condition in the execution of said instruction group;

wherein each of said instruction group is associated with a group tag number, and wherein an instruction in an instruction group is identified by said instruction group's group tag number concatenation with a multiple bit mask, wherein said mask indicating the location of said instruction in said instruction group.

2. The GCT as recited in claim 1 wherein said trouble identifier is a single bit.

3. The GCT as recited in claim 1 wherein said table entry further comprises a single exception information identifier for all instructions in said associated instruction group.

4. The GCT as recited in claim 1 wherein said GCT has twenty table entries.

5. A group completion table (GCT) that manages execution of instruction groups having more than one executable instruction, said GCT comprising:
   a plurality of write ports, each receiving instruction groups; and
   a plurality of table entries, wherein each of said plurality of table entries is associated with a respective instruction group and includes:
      a plurality of instruction completion identifiers, each of said plurality of instruction completion identifiers corresponding to a specific instruction in said associated instruction group; and
      a trouble identifier that will flag the occurrence of any exception condition in the execution of said instruction group.

6. The GCT as recited in claim 1 wherein said instruction group has five instruction.

7. A group completion table (GCT) that manages execution of instruction groups having more than one executable instruction, said GCT comprising:
   a plurality of table entries, wherein each of said plurality of table entries is associated with a respective instruction group and includes:
      a plurality of instruction completion identifiers, each of said plurality of instruction completion identifiers corresponding to a specific instruction in said associated instruction group;
      a trouble identifier that will flag the occurrence of any exception condition in the execution of said instruction group; and
   wherein a last instruction in said instruction group is a delimiter identifier.

8. The GCT as recited in claim 7 wherein said delimiter identifier is a branch (BR) instruction.

9. The GCT as recited in claim 7 wherein said delimiter identifier is a no-operation (no-op) instruction.

10. A method for managing the execution of an instruction group having more than one executable instruction, comprising the steps of:
    assigning a group identifier to said instruction group;
    associating a table entry in a group completion table with said instruction group using said group identifier;
    indicating the completion of each executable instruction in said instruction group using a plurality of instruction completion identifiers within said table entry, each of said plurality of instruction completion identifiers corresponding to a specific instruction in said instruction group;
    setting, in response to encountering at least one exception condition in the execution of said instruction group, a trouble identifier within said table entry; and
    flushing an instruction group in response to said trouble identifier being set in an associated table entry of said instruction group;
    wherein said step of flushing an instruction group includes the step of generating a flush mask to all execution units; and
    wherein said step of flushing an instruction an instruction group includes the step of identifying said instruction group using its group identifier.

11. The method as recited in claim 10 further comprising the step of utilizing, in response to encountering exception conditions in the execution of said instruction group, a single exception information identifier within said table entry.

12. The method as recited in claim 10 wherein said trouble identifier is a single bit.

13. The method as recited in claim 10 wherein said step of flushing includes the steps of:
    refetching said instruction group;
    breaking said refetched instruction group into individual executable instructions; and
    executing said individual instructions separately.

14. The method as recited in claim 13 wherein said step of refetching said instruction group includes the step of utilizing an effective address (EA) of a first instruction in said instruction group.

15. A method for managing the execution of an instruction group having more than one executable instruction, comprising the steps of:
    assigning a group identifier to said instruction group;
    associating a table entry in a group completion table with said instruction group using said group identifier;
    indicating the completion of each executable instruction in said instruction group using a plurality of instruction completion identifiers within said table entry, each of said plurality of instruction completion identifiers corresponding to a specific instruction in said instruction group;
    setting, in response to encountering at least one exception condition in the execution of said instruction group, a trouble identifier within said table entry;
    flushing an instruction group in response to said trouble identifier being set in an associated table entry of said instruction group; and
    wherein said step of flushing an instruction group includes the step of setting said instruction completion identifiers associated with the rest of said executable instructions to indicate completion in response to said setting of said trouble identifier by the next-to-complete executable instruction in said instruction group.

16. A method for managing the execution of a plurality of instruction groups, wherein each of said plurality of instruction groups having more than one executable instruction, comprising the steps of:
    assigning a different group identifier to each of said plurality of instruction groups;
    associating a separate table entry in a group completion table with each of said plurality of instruction groups using said group identifiers;
    indicating the completion of each executable instruction in each of said plurality of instruction groups using a plurality of instruction completion identifiers within each of said table entries, each of said plurality of instruction completion identifiers corresponding to a specific instruction in each of said plurality of instruction groups;
    setting, in response to encountering an exception condition in the execution of said plurality of instruction groups, a trouble identifier within said associated table entry;
    flushing said plurality of instruction groups in response to said trouble identifier being set; and
    flushing said plurality of instruction groups includes the step of generating a flush mask.

17. The method as recited in claim 16 wherein the number of bits in said flush mask is equal to the number of table entries in said group completion table.

18. The method as recited in claim 17 wherein said location of each bit in said flush mask corresponds to said group identifier of said plurality of instruction groups.

19. A method for managing the execution of a plurality of instruction groups, wherein each of said plurality of instruction groups having more than one executable instruction, comprising the steps of:

assigning a different group identifier to each of said plurality of instruction groups;

associating a separate table entry in a group completion table with each of said plurality of instruction groups using said group identifiers;

indicating the completion of each executable instruction in each of said plurality of instruction groups using a plurality of instruction completion identifiers within each of said table entries, each of said plurality of instruction completion identifiers corresponding to a specific instruction in each of said plurality of instruction groups;

setting, in response to encountering an exception condition in the execution of said plurality of instruction groups, a trouble identifier within said associated table entry; and marking all younger instructions in a next-to-complete instruction group as finished in response to an older instruction in said next-to-complete instruction group encountering an exception condition.

20. A processor, comprising:

a plurality of execution units; and a group completion table (GCT) that manages execution of instruction groups having more than one executable instruction, said GCT including:

a plurality of write ports coupled to said plurality of execution units; and a plurality of table entries, wherein each of said plurality of table entries is associated with a respective instruction group and includes:

a plurality of instruction completion identifiers, each of said plurality of instruction completion identifiers corresponding to a specific instruction in said associated instruction group; and a trouble identifier that will flag the occurrence of any exception condition in the execution of said instruction group;

wherein each of said instruction group is associated with a group tag number; and wherein an instruction in an instruction group is identified by said instruction group's group tag number concatenation with a multiple bit mask, wherein said mask indicating the location of said instruction in said instruction group.

21. The processor as recited in claim 20 wherein said trouble identifier is a single bit.

22. The processor as recited in claim 20 wherein said table entry further comprises a single exception information identifier for all instructions in said associated instruction group.

23. The processor as recited in claim 20 wherein said instruction group has five instructions.

24. The processor as recited in claim 20 wherein said GCT has twenty table entries.

25. A processor, comprising:

plurality of execution units; and a group completion table (GCT) that manages execution of instruction groups having more than one executable instruction, said GCT including:

a plurality of write ports coupled to sad plurality of execution units; and a plurality of table entries, wherein each of said plurality of table entries is associated with a respective instruction group and includes:

a plurality of instruction completion identifiers, each of said plurality of instruction completion identifiers corresponding to a specific instruction in said associated instruction group;

a trouble identifier that will flag the occurrence of any exception condition in the execution of said instruction group;

wherein a last instruction in said instruction group is a delimiter identifier.

26. The processor as recited in claim 25 wherein said delimiter identifier is a branch (BR) instruction.

27. The processor as recited in claim 25 wherein said delimiter identifier is a no-operation (no-op) instruction.

* * * * *

UNITED STATES PATENT AND TRADEMARK OFFICE
CERTIFICATE OF CORRECTION

PATENT NO. : 6,553,480 B1
DATED : April 22, 2003
INVENTOR(S) : Cheong et al.

It is certified that error appears in the above-identified patent and that said Letters Patent is hereby corrected as shown below:

<u>Column 9,</u>
Line 29, delete "prefetch" and replace with -- refetch --.

<u>Column 14,</u>
Line 23, delete "sad" and replace with -- said --.

Signed and Sealed this

Sixteenth Day of December, 2003

JAMES E. ROGAN
*Director of the United States Patent and Trademark Office*